(12) United States Patent
Hofmann

(10) Patent No.: US 6,602,397 B1
(45) Date of Patent: Aug. 5, 2003

(54) METHOD FOR PRODUCING A FILTER

(75) Inventor: Wilfried Hofmann, München (DE)

(73) Assignee: NFT Nanofiltertechnik Gesellschaft mit beschrankter Haftung, Bad Homburg (DE)

( * ) Notice: Subject to any disclaimer, the term of this patent is extended or adjusted under 35 U.S.C. 154(b) by 0 days.

(21) Appl. No.: 10/031,799

(22) PCT Filed: Apr. 5, 2000

(86) PCT No.: PCT/EP00/03030

§ 371 (c)(1),
(2), (4) Date: Oct. 26, 2001

(87) PCT Pub. No.: WO00/66815

PCT Pub. Date: Nov. 9, 2000

(30) Foreign Application Priority Data

Apr. 30, 1999 (DE) .......................................... 199 19 903

(51) Int. Cl.⁷ ................................................ C25F 3/00
(52) U.S. Cl. ...................................... 205/655; 205/656
(58) Field of Search .................................. 205/655, 656

(56) References Cited

U.S. PATENT DOCUMENTS

| | | |
|---|---|---|
| 4,369,099 A | 1/1983 | Kohl et al. |
| 5,139,624 A | 8/1992 | Searson et al. |
| 5,348,627 A | 9/1994 | Propst et al. |
| 6,328,876 B1 * | 12/2001 | Hofmann et al. ............ 205/655 |
| 6,413,408 B1 * | 7/2002 | Berger et al. ................ 205/655 |
| 6,423,207 B1 * | 7/2002 | Heidari et al. ............... 205/655 |

FOREIGN PATENT DOCUMENTS

| | | |
|---|---|---|
| DE | 42 02 454 C1 | 7/1993 |
| EP | 0 018 556 A1 | 4/1980 |
| EP | 0 296 348 A1 | 5/1988 |
| WO | WO 97/04340 | 2/1997 |
| WO | WO 99/05344 | 2/1999 |

OTHER PUBLICATIONS

International Search Report for the present application, dated Apr. 30, 1999 from the European Patent Office.

* cited by examiner

*Primary Examiner*—Arun S. Phasge
(74) *Attorney, Agent, or Firm*—Senniger, Powers, Leavitt & Roedel

(57) ABSTRACT

A method for the production of filters in which a blank of n- or p-doped etchable semiconductor material is connected as an anode or a cathode according to doping. The method includes contacting a first side of the blank with an etching solution in which a counterelectrode is arranged to electrochemically etch the first side, and supplying activation energy to generate minority charge carriers to the blank during the etching process. The activation energy supplied per unit time is reduced with increasing etching progress.

17 Claims, 7 Drawing Sheets

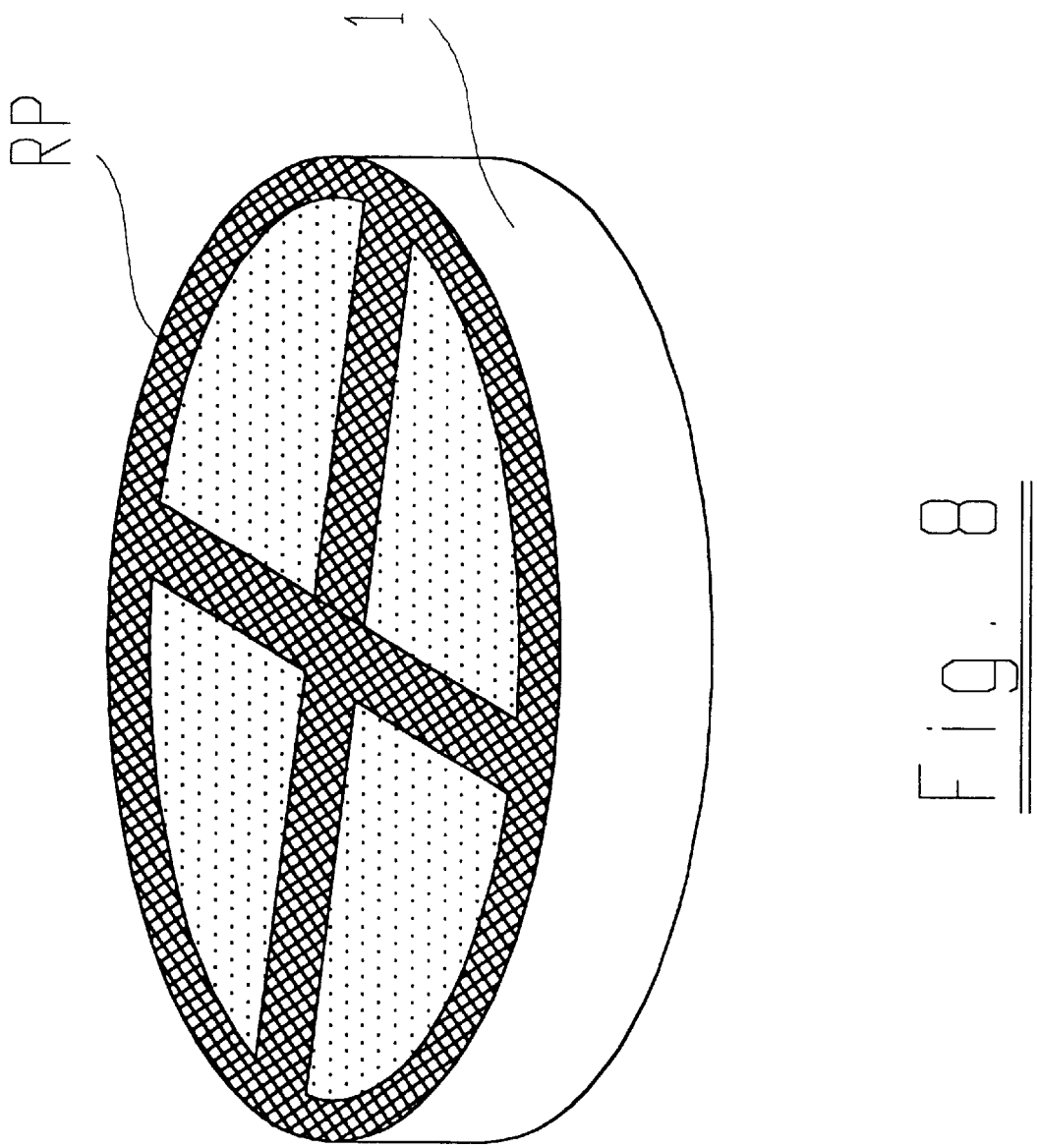

METHOD FOR PRODUCING A FILTER

The invention concerns a method for production of a filter.

This type of method is known from WO 99/05344. Fine filter pores are etched with this method in an n- or p-doped silicon blank, which is connected as an anode or a cathode. A first side of the blank is then dipped in an etching solution in which a counterelectrode is arranged to generate an etching current. At the same time, a second side of the silicon blank opposite the first side is exposed to light so that minority charge carriers are created in the blank. The blank therefore forms a "working electrode" that is electrochemically perforated as a function of its doping, the etching current density and the chemical composition of the etching liquid.

Ultrafine filters can be produced with this method, whose structural dimensions, i.e., pore diameter and pore spacing, lie in the micrometer range ($\mu$m) to the nanometer range (nm). If the structural dimensions are smaller than about 100 nanometers, however, the microstructure of the filter can become porous or sponge-like.

One problem here is that the etching process occurs not only on the "pore bottom," but also across the pores, which can lead to a situation in which the pore cross sections are not kept precisely constant over the pore length and, in addition, adjacent pores are connected to each other. Such "cross-etchings" occur, in particular, when minority charge carriers or "defect electrons" reach the pore walls of the blank being processed. The defect electrons are "holes" in the valence band of the blank atoms and behave like positively charged particles.

Another method for production of ultrafine filters by electrochemical etching is described in U.S. Pat. No. 5,139,624, in which it is stated that the pore diameter depends on the etching current and the dopant concentration and the etching solution concentration.

U.S. Pat. No. 5,348,627 describes a similar etching process in which the blank is exposed to light to generate holes in the valence band, during which the light intensity can be alternately varied in order to vary the etching rate. A broadband light source or monochromatic light source is then used.

DE 4 202 454 C1 describes a similar method for the production of a filter, geared toward generating pores, whose cross sections are not constant but have cavity-like expansions. Such cross-sectional expansions are achieved by changing the current density in the substrate wafer, in which the cross-sectional enlargement is achieved by increasing the illumination intensity.

EP 0 296 348 A1 also describes an etching method in which electrolysis is initiated by illuminating the silicon element from the back and the illumination is kept constant or varied in time in order to control the etching current by the formation of minority charge carriers. The etching current is then a function of the light impinging on the silicon element and primarily determines the hole width.

SUMMARY OF THE INVENTION

The objective of the present invention is to improve a method, as mentioned at the outset, so that a roughly equivalent stipulated pore diameter can be maintained over the entire length of the filter pores.

The basic principle of the invention consists of reducing the generation rate of minority charge carriers that are formed during the etching process in the blank being etched as a function of the etching progress, i.e., with increasing pore depth.

The blank employed here consists of an n- or p-doped etchable semiconductor material, like silicon, GaAs, etc., which is connected according to the doping as an anode or a cathode and dipped with at least one first side into an etching liquid in which a counterelectrode is present. Activation energy is supplied to the blank during the etching process, for example, by light exposure or by heat. Minority charge carriers or defect electrons are generated by the activation of the individual atoms of the blank, in which the generation rate increases with the activation energy supplied per unit time and with the supplied activation power. If the blank is connected as the anode, for example, i.e., positively charged, the positively charged defect electrons or holes migrate to the outside of the blank to the side facing the negatively charged counterelectrode, i.e., the cathode.

The electric field that can be established in the blank is then "bent" by the smallest recesses or irregularities in the planar surface of the blank to their tips or bottoms, in which the defect electrons follow the electric field, which means that etching primarily occurs on the bottoms or tips of the recesses and fine pores are therefore formed.

It turns out that with increasing etching progress, i.e., the increasing pore depths, the defect electrons not only migrate to the "pore bottoms," where the etching progress is supposed to primarily occur, but also to the pore walls, which would lead to the enlargement of the pore diameter. This "cross-etching" can be avoided on the pore walls according to the invention if the activation power fed to the blank or the activation energy fed per unit time is reduced as a function of the etching progress and the increasing pore depth. Very fine pores with roughly constant cross sections can therefore be produced, whose diameters can lie in the range from a few hundred micrometers to one nanometer.

It is known from the prior art that the radiation intensity can be increased to increase the pore cross section, but it thus far has not been recognized that the activation energy supplied to the blank must be reduced with increasing pore depth for etching pores with constant cross sections. In contrast to the prior art, an assignable pore diameter can be kept roughly constant over the entire pore length with the invention.

If the activation energy is supplied by light exposure, the side of the blank opposite the side dipped into the etching liquid is preferably exposed. The supplied activation energy can be achieved, for example, by sequential connection and disconnection of the light source or by a gradual reduction of the light intensity, i.e., by dimming the light source. A light source with a broad frequency spectrum or a monochromatic light source can be used, whose frequency is adjusted to the blank material.

According to a modification of the invention, "start recesses" for the pores being etched are created before the electrochemical etching of the blank on its first side, the spacing and the arrangement of which correspond to the desired pore spacing of the pore distribution. The start recesses, for example, can be pre-etched using a hole mask or produced with laser beams so that a filter with a very uniform micro- or pore structure can be produced.

The dopant concentration of the blank can lie between $10^{16}$ and $10^{19}$ cm$^{-3}$ or higher. It is also possible to dope the blank with different types of atoms and optionally different dopant concentrations. The individual dopants have characteristic activation energies and can therefore be activated individually, i.e., when monochromatic light is used. By changing the wavelength of the light, one dopant after another will "respond." One preferably begins with the highest doped or most highly concentrated dopant and proceeds in diminishing progress steps to the more weakly concentrated dopant in order to reduce in stages the generation of defect electrons. It can be prescribed as a support that the dopant concentration diminish in the etching direction, which is achieved by allowing the dopant to diffuse from the first side during doping.

According to a modification of the invention, it can be prescribed that specified regions of the blank be only relatively weakly doped or undoped and are therefore hardly attacked or are not attacked by the etchant at all during the etching process. Because of this, unetched "stiffening ribs" can be produced in the blank that increase the mechanical strength of the filter being produced and improve handling.

According to another modification of the invention, a magnetic field is generated during the etching process directed essentially perpendicular to the etching direction and superimposed on the electric field established in the blank. The charge carrier movement produced by the electric field in the blank is therefore superimposed on a magnetically induced movement caused by Lorentz forces, so that the number of defect electrons reaching the pore walls is further reduced. It could be prescribed as a support that the magnetic flux density diminish in the etching direction, which permits an even more favorable deflection of the defect electrons.

BRIEF DESCRIPTION OF THE DRAWINGS

FIG. 8 shows a schematic view of the filter with stiffening ribs.

DETAILED DESCRIPTION OF THE PREFERRED EMBODIMENT

Figure 1:
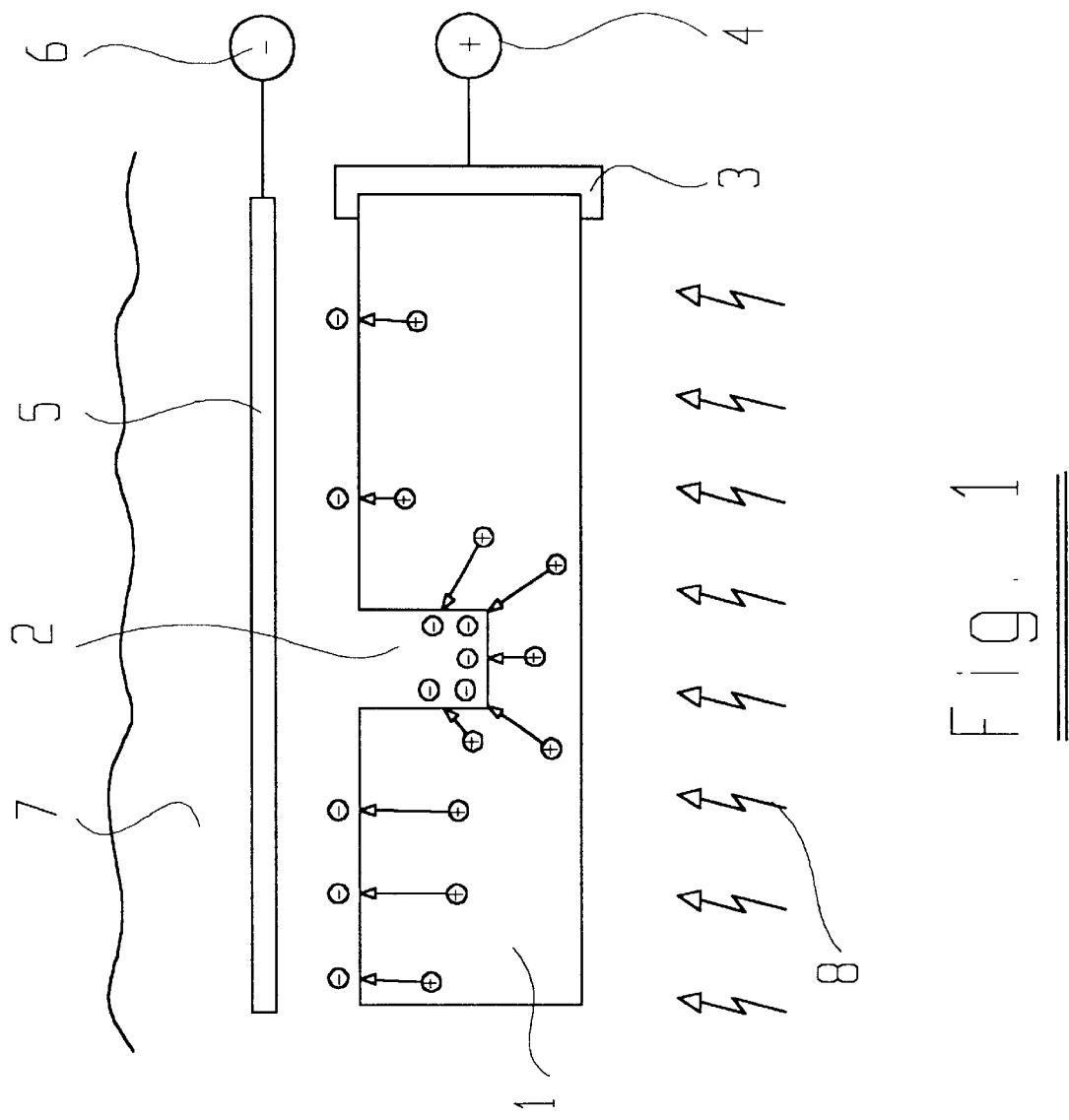
FIG. 1 shows a schematic view of an arrangement for execution of the method.

FIG. 1 shows a sketch from the initially mentioned WO 99/06344, whose contents are fully referred to here. A blank 1 in the form of silicon wafer, which is weakly n-doped here, has a recess 2 on the surface. The blank 1 is connected to the anode 4 of a current source via an electrically conducting mount 3. A counterelectrode 5 is connected to the cathode 6 of the current source. Because of the forming electric field, the field line density in the region of recess is greater than in the other regions. The charge carriers of the etching liquid marked "−" therefore preferably reach he bottom of the recess 2 so that the etching effect of the etching liquid 7 attacking the top of blank 1 is intensified at these sites. The minority charge carriers or defect electrons marked "+" in the blank 1 are generated by illumination of the blank bottom, which is indicated by light arrow 8. To obtain recesses 2 or pores, whose pore diameters are roughly constant over the pore length, the generation rate of the minority charge carriers is reduced with increasing etching progress, which can be achieved by reducing the light intensity and is further explained in conjunction with the following figures.

The blank 1 can be doped relatively homogeneously through its entire volume, for example, with a dopant concentration between $10^{16}$ and $10^{19}$ cm$^{-3}$. As an alternative, however, it can also be prescribed that the dopant concentration diminish in the etching direction, i.e., from the side of blank facing counterelectrode 5 to the opposite side, which supports a reduction in the generation rate of the defect electrons with increasing etching progress. Several different dopants, which can be activated by corresponding wavelengths can also be contained in different concentrations in blank 1, which permits stepwise reduction of the defect electron generation rate, in which the individual dopants are excited by light with dopant-specific wavelength.

The etching process is not conducted until the recess 2 is fully etched through blank 1 and a through-hole is formed. The diameter of the through-hole depends essentially on the dopant concentration of blank 1 since this influences the electric field forming in blank 1. The weaker the dopant, the smaller the pore diameter since the etching process then primarily occurs on the pore bottom or on the bottom of recess and the side walls of the recess 2 are etched away last.

Figure 2:
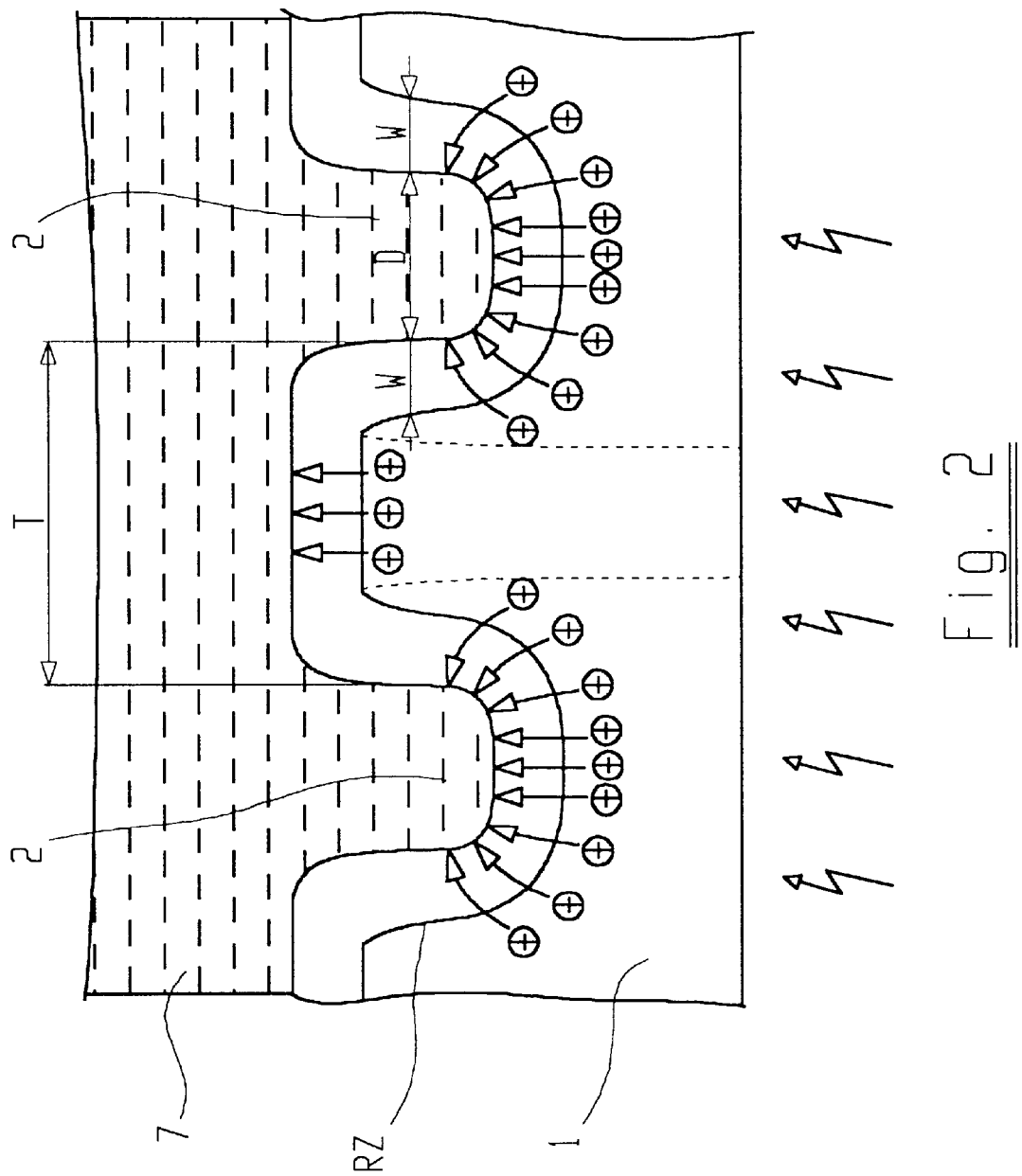
FIG. 2 shows a cross section through the blank right after the beginning of the etching process.

FIG. 2 shows a cross section through blank 1 right after the beginning of the etching process. A space charge zone RZ or depletion zone is formed on blank 1 by the applied voltage (cf. FIG. 1), which is shown here by a dashed line and has the average width W. The space charge zone RZ is comparable to a pn junction, over which the applied voltage drops. The electric field in the space charge zone RZ is varied by recess 2, as shown by the movement arrows of the defect electrons, which are represented by the "+" symbol. The recesses 2 have an essentially constant diameter D that corresponds to the pore diameter of the filter being etched. The pore diameter D and the space charge zone enclosing the pores of width W therefore form a region of width D+2W in which the defect electrons migrate to the pores 2 and etch them further, primarily on the pore bottom. In order to achieve pores with a roughly constant diameter, it is important that the number of collected defect electrons in the region of the pore bottom is significantly greater than in the region between the two adjacent pores, which have a spacing T between them. Etching therefore occurs primarily in those regions in which the density of the defect electrons and reactants, i.e., etchants, is high, i.e., on the bottom of recesses 2. The etching removal, on the other hand, is much more limited between the pores.

Figure 3:
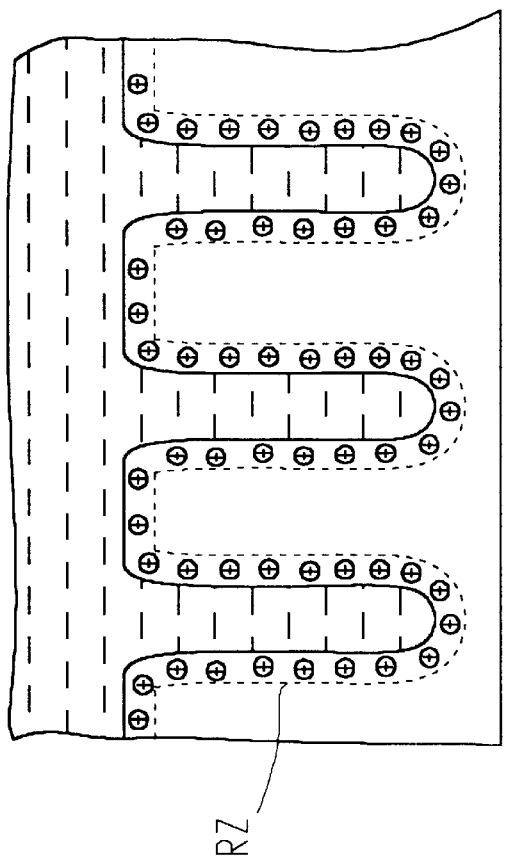
FIG. 3 shows an undesired distribution of defect electrons during the etching process.

If, as schematically shown in FIG. 3, the pores become deeper during the etching process, the space charge zone RZ also extends accordingly. If, as is further apparent in FIG. 3, the spacing of the individual pores is relatively large in relation to the width of the space charge zone and the generation rate of the defect electrons remains as high as at the beginning of the etching process, which corresponds to the prior art, then numerous defect electrons will reach the pore walls and cause undesired cross-etching there. The state depicted in FIG. 3 would therefore lead to undesired and uncontrolled widening of the cross sections of the pores.

Figure 4:
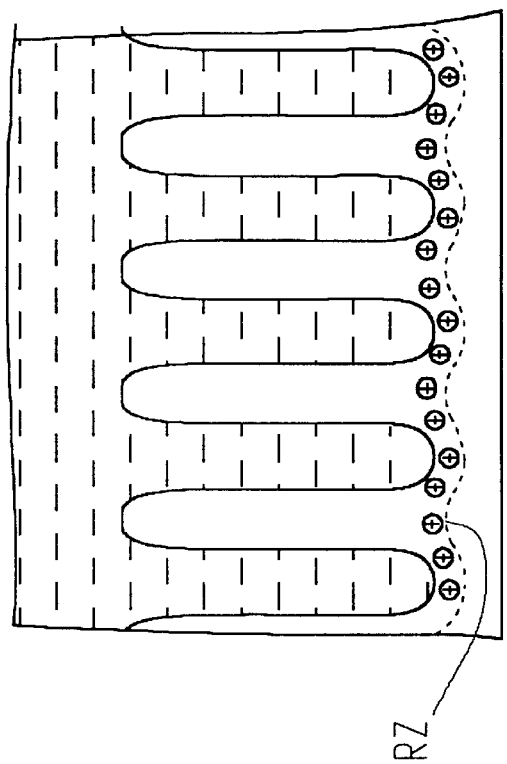
FIG. 4 shows a favorable distribution of defect electrons attainable by the invention.

If it can be ensured that the space charge zone RZ forms fully between the pores at small pore diameters during the entire etching process, i.e., even with increasing pore depth, the etching removal of the pore walls can be avoided, which is shown in FIG. 4.

As is apparent from FIG. 4, the boundary of the space charge zone RZ runs "beneath" the pore bottom, so that the defect electrons collect primarily in the vicinity of the pore bottom and etching also occurs primarily only in the region of the pore bottom.

The situation depicted in FIG. 4 can be achieved by reducing the etching rate of the defect electrons with increasing etching removal, i.e., by increasing the pore depth. This is possible, on the one hand, by reducing the radiation power supplied (cf. FIG. 1) or by reducing the voltage between the blank and the reference electrode. A further improvement can be achieved by appropriately pre-structuring the blank before the beginning of the etching process by choosing the spacing of the start recesses for the pores being etched so that the desired thicknesses of the pore walls and the spacings T (cf. FIG. 2) of the individual pores and the width W of the space charge zone being established fulfill the condition T<2W.

This condition can be maintained by pre-etching with a corresponding spaming of the start recesses. As a supplement, it can also be prescribed that the dopant concentration diminish in the etching direction or that several different dopants of different concentrations be provided, which are excited in succession by monochromatic light, permitting a stepwise reduction in the defect electrons present.

The generation rate of the defect electrons in the blank, i.e., the activation energy supply, is controlled so that essentially all of the generated defect electrons during the etching process are always consumed. A correspondingly concentrated etching liquid is therefore essential, i.e., an excess of reactants in the etchant relative to the number of defect electrons. Depending on the number of defect electrons in comparison with the number of available reactants in the etchant, pore formation or electropolishing occurs on the first side of the blank.

As shown in FIG. 1, "control" of the defect electrons occurs, for example, by controlling the illumination of the blank 1. One possibility consists of varying the irradiation intensity during the etching process, in which the number of generated defect electrons can be reduced by a time-controlled reduction of the irradiation intensity. For this purpose, for example, a pulsed or "interval irradiation" with radiation intervals and radiation pauses can be prescribed, in which the light source can be simply connected and disconnected. The interval lengths are then adjusted to the instantaneous pore depths. For example, after each irradiation interval, all defect electrons generated during this interval are supposed to be consumed before new defect electrons are generated in the next irradiation interval. An appropriate sequence can be empirically determined beforehand. As an alternative, a shutter or aperture technique can be used in which an open cover is arranged between the light source and the blank. A light source with an aperture can also be used, which opens and closes accordingly.

As an alternative, a "variable" light source can be used, i.e., a dimmer, which is controlled according to a preprogrammed program by a microprocessor and adjusts the light intensity of the light source to the etching progress. Naturally, during use of the microprocessor, other process parameters, like the voltage between the blank 1 and the counterelectrode 5 or the etchant concentration can also be varied in order to ensure "depletion" of the defect electrons on the pore walls. In principle, any illumination control that permits the depletion of the defect electrons on the pore walls is appropriate.

During pretreatment of the blank, i.e., during generation of the start recesses, different methods can be used, for example, etching with KOH, standard lithographic methods or ion bombardment using hole masks or laser-induced processes. With such pretreatment, the start recesses can be generated in any desired patterns or arrangements on the side of the blank being etched, in which the number of pores per filter surface can be established exactly as desired.

Figure 5:
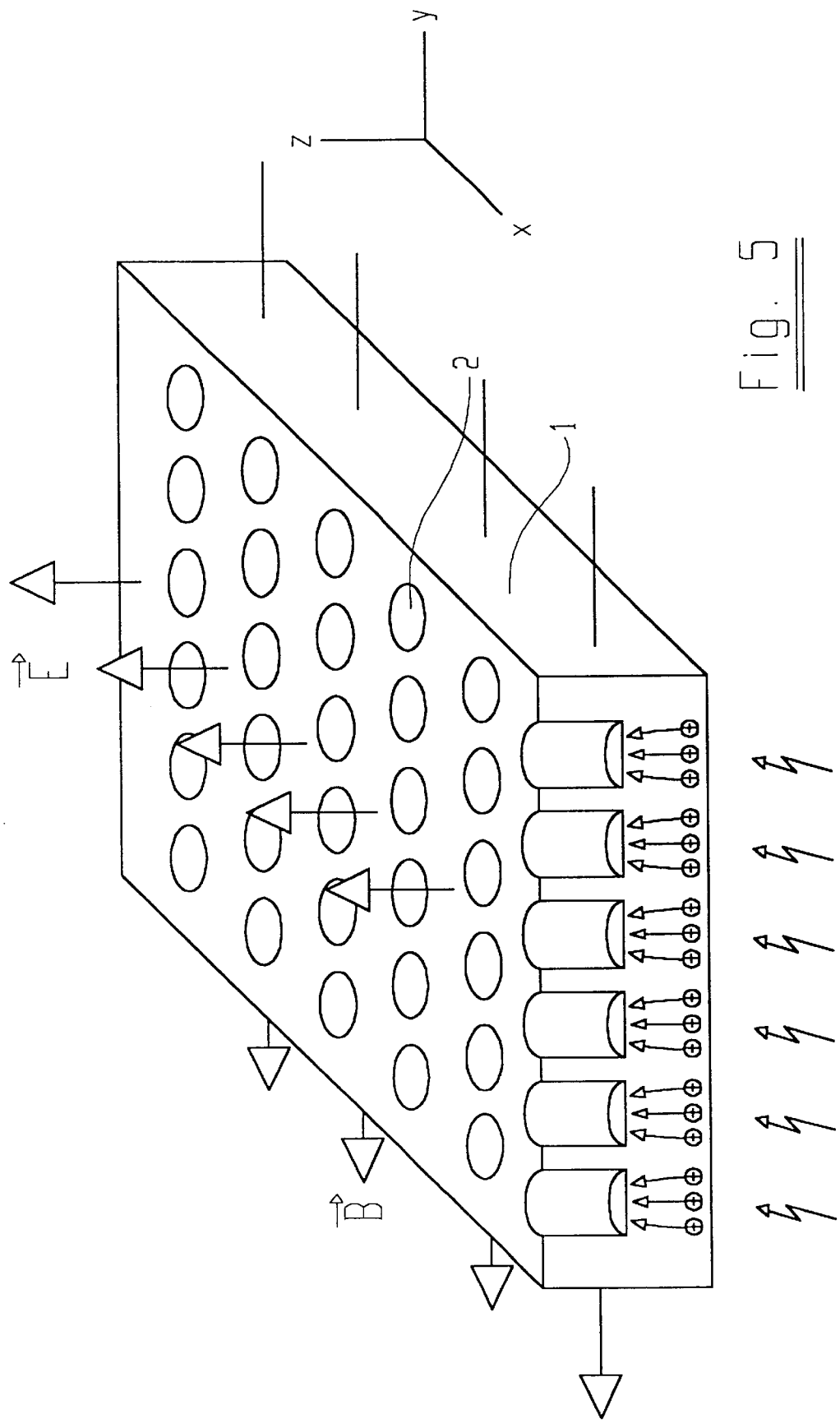
FIG. 5 shows a practical example in which a magnetic field is superimposed on the electric field.

FIG. 5 shows a practical example in which a magnetic field B is superimposed on an electric field E established perpendicular to it. The electric field E runs here in the direction of the positive Z axis and the magnetic field B in the direction of the negative Y axis. The defect electrons denoted "+" move in the direction of the electric field. As a result of this charge carrier movement in the magnetic field, Lorentz forces are produced that deflect the defect electrons perpendicular to the electric field E and perpendicular to the magnetic field B. The defect electrons therefore execute gyro movements and can be better kept away, especially by changing the magnetic field intensity and the distribution of the side of blank 1 in contact with the etching liquid (cf. FIG. 1).

Figure 6:
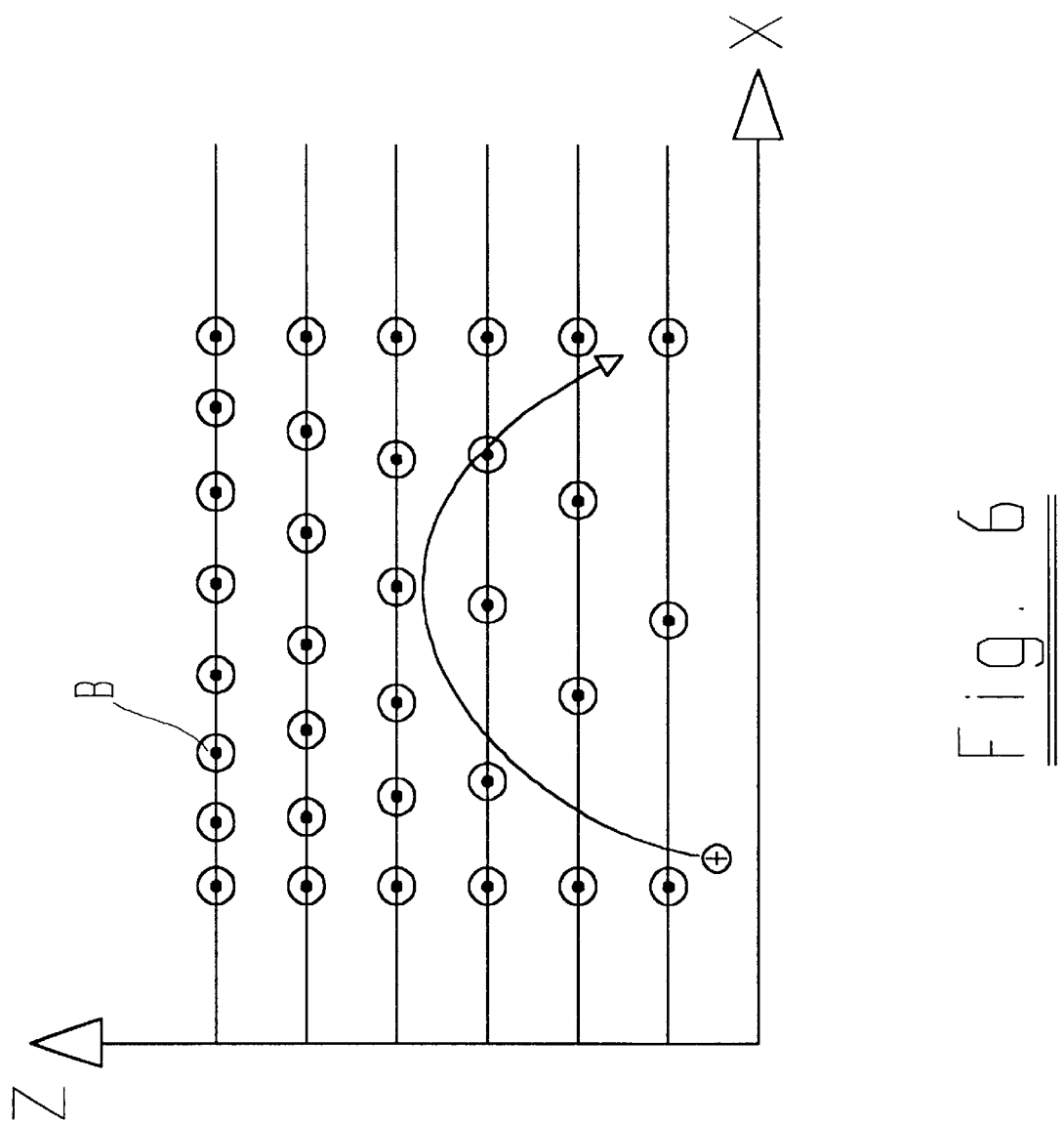
FIG. 6 shows a diagram to explain the method of action of the magnetic field.

FIG. 6 schematically shows a section of the blank 1 in the XZ plane (FIG. 5), in which the magnetic field B is represented by a circular symbol and emerges from the plane of the drawing. The intensity of the magnetic field B increases here in the Z direction, i.e., opposite the etching direction and therefore acts as a "magnetic mirror" that deflects the defect electron, which is qualitatively shown by an arrow. Because of this magnetic deflection, a situation is achieved in which only a few defect electrons reach the pore walls, which permits maintenance of a roughly constant crass section of the pore.

Figure 7:
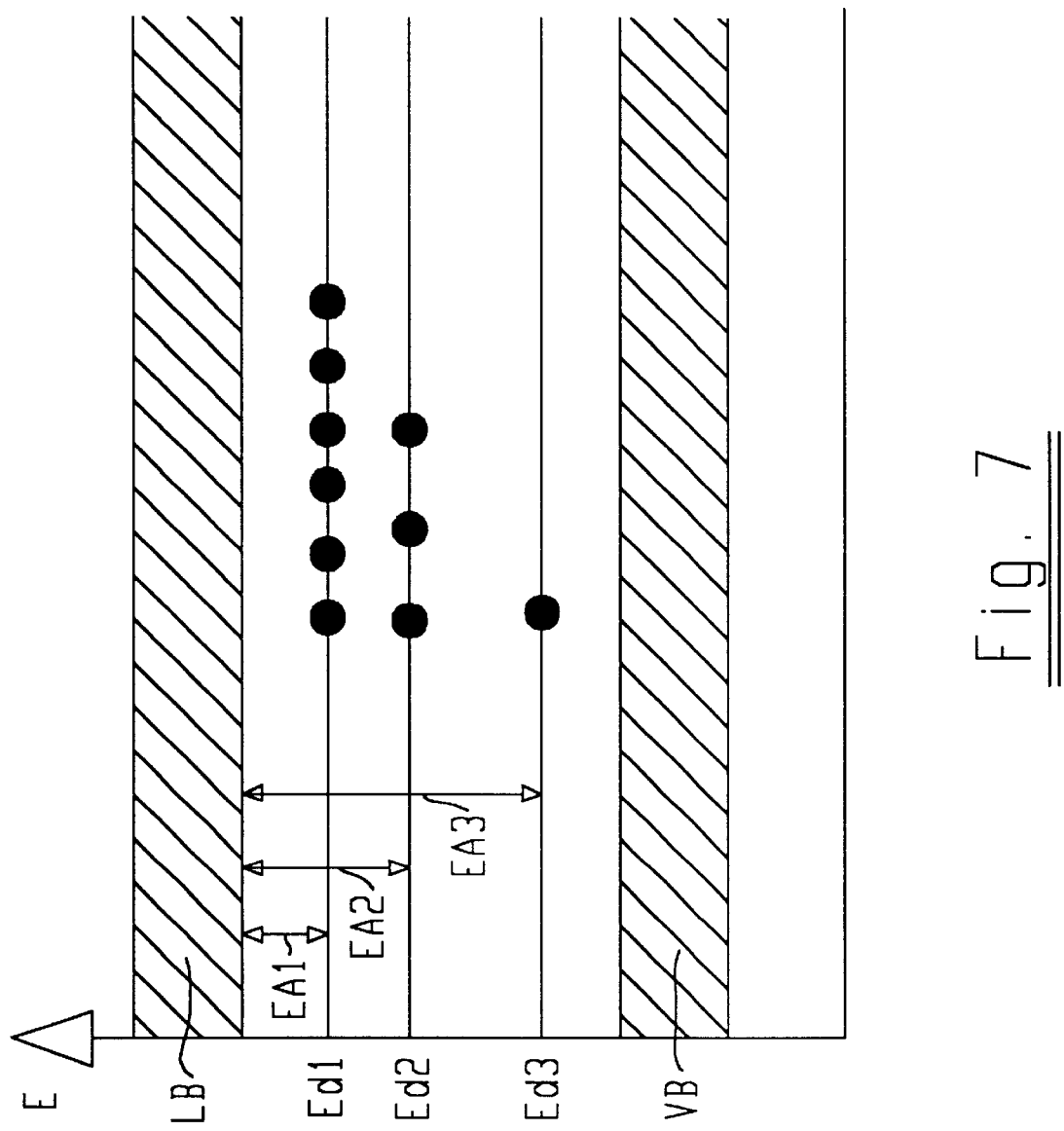
FIG. 7 shows an energy scheme of a blank material.

FIG. 7 shows an energy diagram of a blank with a valence band VB fully occupied with electrons (not shown) and an unoccupied conduction band LB, each of which defines the admissible energy states of the electrons of the blank. Between the valence band VB and the conduction band LB, there is an energy gap that can also be referred to as the forbidden zone. If a semiconductor is p- or n-doped, the energy states of the electrons of the doping atoms lie between the valence band and the conduction bands. Three such energy states $Ed1$-$Ed3$ are drawn in FIG. 7, each indicating a specific dopant, i.e., corresponding to a certain type of atom. The number of electrons represented by the black points indicates that the first dopant, whose energy level is $Ed1$, is more highly concentrated than the second dopant and this again is more highly concentrated than the third dopant.

To generate defect electrons, the electrons must be raised into the conduction band LB. This is possible, in principle, by activation of the electrons from the valence band VB, which, however, requires relatively high energy. The required activation energy to generate defect electrons is reduced by doping the blank since the energy levels $Ed1$-$Ed3$ lie between the valence band VB and the conduction band LB. If the blank 1 is irradiated with photons of energy $EA1$, the electrons can be raised from energy level $Ed1$ into the conduction band. Accordingly, by activation energies $EA2$ and $EA3$, the electrons can be raised from energy levels $Ed2$ and $Ed3$ into the conduction band. When monochromatic light is used, a specific generation rate of defect electrons can therefore be achieved according to the doping concentrations of the dopants. This means that different appropriate types of dopants can be doped into the semiconductor blank in different concentrations and, on this account, a gradual distribution of energy levels and available defect electrons can be created in the energy band scheme. The probability that defect electrons will reach the pore walls can also be prevented by doping.

In order to produce the depletion of the defect electrodes on the side of the semiconductor blank exposed to the etchant, the blank 1 is only relatively weakly doped, for example, less than $10^{19}$ cm$^{-3}$. It can also be prescribed that the blank be doped in defined rib regions RP (cf. FIG. 8) with a dopant concentration below $10^{16}$ cm$^{-3}$. If silicon is used as the semiconductor material, such limited doping ensures that the rib regions RP are resistant to an etching attack, which improves the mechanical strength of the etched blank. Moreover, etching can also be guided or channeled in the direction of the thickness of the blank on this account. The etching segments can be stipulated in the blank that advantageously influence the movement of the defect electrons. The rib regions can extend parallel to the etching direction through the entire blank.

As an alternative to the explained application, which describes the production of filters, there are additional applications. The perforated wafers according to the invention can be used, for example, as microresonators or as catalysts whose pore surfaces are coated so that a very favorable, i.e., large, surface/volume ratio is produced. Application in micromechanics is also possible, i.e., the pores can be used for fixing or mounting micromechanical components. A wafer precisely perforated in this fashion can also be used as a "light display" in which the individual pores can be provided with individually controllable means of illumination.

Doping the blank can occur, for example, by neutron bombardment, by admixing the dopant into the crystal melt or by heating the silicon blank during the simultaneous diffusion of the doping gases.

What is claimed is:

1. A method for the production of filters comprising
   a) connecting a blank of n- or p-doped etchable semiconductor material as an anode or a cathode according to doping;
   b) contacting a first side of the blank with an etching solution in which a counterelectrode is arranged to electrochemically etch the first side; and
   c) supplying activation energy to generate minority charge carriers to the blank during the etching process, the activation energy supplied per unit time being reduced with increasing etching progress.

2. A method as set forth in claim 1 wherein the activation energy is supplied by irradiation of a second side opposite the first side of the blank with a light source.

3. A method as set forth in claim 2 wherein the number of photons impinging on the blank per unit time is reduced with increasing etching progress.

4. A method as set forth in claim 2 wherein the irradiation of the blank is repeatedly interrupted during the etching process, the consecutive irradiation intervals being shortened and/or the irradiation pauses in between being lengthened.

5. A method as set forth in claim 1 wherein the activation energy is supplied by irradiation with a broadband light source.

6. A method as set forth in claim 1 wherein the activation energy is supplied by a monochromatic light source in which the wavelength is varied with increasing etching progress.

7. A method as set forth in claim 1 wherein the activation energy is supplied to the blank by supplying heat.

8. A method as set forth in claim 1 wherein the blank is pretreated before electrochemical etching and in which start recesses for pores being etched are generated at least on the first side of the blank.

9. A method as set forth in claim 8 wherein the start recesses are pre-etched with a hole mask.

10. A method as set forth in claim 8 wherein the start recesses are generated with laser beams.

11. A method as set forth in claim 1 wherein a magnetic field that passes through the blank is generated, passing through the blank substantially perpendicular to the etching direction.

12. A method as set forth in claim 11 wherein the magnetic flux density diminishes in the etching direction.

13. A method as set forth in claim 1 wherein the blank is doped with a dopant with a concentration of up to $10^{19}$ cm$^{-3}$.

14. A method as set forth in claim 1 wherein the blank is doped with several different dopants and coordinated dopant uconcentrations.

15. A method as set forth in claim 1 wherein dopant concentration diminishes in the etching direction.

16. A method as set forth in claim 1 wherein the blank is doped in partial regions with a dopant concentration lower than $10^{16}$ cm$^{-3}$.

17. A method as set forth in claim 1 wherein the blank consists primarily of silicon.

* * * * *